(12) United States Patent
Seo et al.

(10) Patent No.: US 11,715,286 B2
(45) Date of Patent: Aug. 1, 2023

(54) METHOD AND SYSTEM FOR RECOGNIZING MARINE OBJECT USING HYPERSPECTRAL DATA

(71) Applicant: KOREA INSTITUTE OF OCEAN SCIENCE & TECHNOLOGY, Busan (KR)

(72) Inventors: Dongmin Seo, Seoul (KR); Sangwoo Oh, Sejong-si (KR)

(73) Assignee: KOREA INSTITUTE OF OCEAN SCIENCE & TECHNOLOGY, Busan (KR)

( * ) Notice: Subject to any disclaimer, the term of this patent is extended or adjusted under 35 U.S.C. 154(b) by 0 days.

(21) Appl. No.: 17/999,386

(22) PCT Filed: Aug. 24, 2021

(86) PCT No.: PCT/KR2021/011287
§ 371 (c)(1),
(2) Date: Nov. 18, 2022

(87) PCT Pub. No.: WO2022/139111
PCT Pub. Date: Jun. 30, 2022

(65) Prior Publication Data
US 2023/0196743 A1 Jun. 22, 2023

(30) Foreign Application Priority Data
Dec. 24, 2020 (KR) .................. 10-2020-0183172

(51) Int. Cl.
*G06K 9/00* (2022.01)
*G06N 3/00* (2023.01)
(Continued)

(52) U.S. Cl.
CPC ........ *G06V 10/7747* (2022.01); *G06V 10/273* (2022.01); *G06V 20/194* (2022.01)

(58) Field of Classification Search
CPC . G06V 10/7747; G06V 20/194; G06V 10/273
See application file for complete search history.

(56) References Cited

U.S. PATENT DOCUMENTS

2016/0266246 A1 9/2016 Hjelmstad
2020/0167586 A1* 5/2020 Gao ..................... G06N 3/08

FOREIGN PATENT DOCUMENTS

KR 10-1621354 B1 5/2016
KR 10-1672291 B1 11/2016
(Continued)

OTHER PUBLICATIONS

Ødegård et al, "Underwater hyperspectral imaging: a new tool for marine archaeology", 2018, Applied optics 57.12 (2018), pp. 3214-3223 (10 pages) (Year: 2018).*
(Continued)

*Primary Examiner* — David F Dunphy
(74) *Attorney, Agent, or Firm* — Lewis Roca Rothgerber Christie LLP

(57) ABSTRACT

Disclosed is a method for recognizing a marine object based on hyperspectral data including collecting target hyperspectral data; preprocessing the target hyperspectral data; and detecting and identifying an object included in the target hyperspectral data based on a marine object detection and identification model, trained through learning of the detection and identification of the marine object. According to the present invention, the preprocessing and processing of the hyperspectral data collected in real time according to a communication state may be performed in the sky or on the ground.

9 Claims, 19 Drawing Sheets

(51) Int. Cl.
*G06V 10/774* (2022.01)
*G06V 20/10* (2022.01)
*G06V 10/26* (2022.01)

(56) References Cited

FOREIGN PATENT DOCUMENTS

| KR | 10-2018-0065411 A | 6/2018 |
|---|---|---|
| KR | 10-2258903 B1 | 6/2021 |
| KR | 10-2270834 B1 | 6/2021 |

OTHER PUBLICATIONS

International Search Report for International Application No. PCT/KR2021/011285 dated Dec. 21, 2021 and English Translation, 8 pages.
International Search Report of PCT/KR2021/011287, dated Dec. 15, 2021, 6 pages.
Noh, et al., "A study on Learning Medical Image Dataset and Analysis for Deep Learning", Proceedings of Annual Spring Conference of KIPS 2018, vol. 25. No. 1, May 2018, pp. 350-351.
Lee, "A Method of Color Image Segmentation based on DBSCAN Using Compactness of Superpixels and Texture Information", Journal of the Korea Society of Digital Industry and Information Management, vol. 11, No. 4, Dec. 201, pp. 89-97.
Seo, et al., "Maritime object detection and learning data construction using DSCAN", Autumn Conference of the Korean Society of Marine Environment & Safety 2020, Nov. 26, 2020, pp. 1-10.

\* cited by examiner

METHOD AND SYSTEM FOR RECOGNIZING MARINE OBJECT USING HYPERSPECTRAL DATA

CROSS-REFERENCE TO RELATED APPLICATION(S)

This application is a U.S. National Phase Patent Application of PCT/KR2021/011287, filed Aug. 24, 2021, which claims priority to Korean patent application 10-2020-0183172, filed on Dec. 24, 2020, the entire content of each of which is hereby incorporated by reference.

TECHNICAL FIELD

The present invention relates to a method and a system for recognizing a marine object based on hyperspectral data, and more particularly, a method for recognizing a marine object based on hyperspectral data using artificial intelligence and a system using the same.

BACKGROUND ART

According to the related art, there has been provided a method for detecting a method for detecting accidental vessels and drowning persons using an aerial hyperspectral image capable of supporting a rapid search work of accident vessels and mission persons due to marine accidents by using a hyperspectral to improve optimized identification ability according to various search objects and improving the degree of discrimination through the results of a reflected light spectrum analysis test for each object.

In the related art, observation information, and location information and reflectance values for each pixel of the detected accidental vessel and drowning person are extracted, the similarity of the spectral characteristics between the spectral reflectance value and an observed reflectance value of a target material is analyzed using library information that has already been built, and constituent materials and occupancy ratios for each pixel of the hyperspectral image are extracted and detected, so that the detection efficiency may be deteriorated. Therefore, the related art is not used for large-scale search and detection. In addition, it was not easy to expand the spectral library by only comparing the similarity with the actually measured spectral library.

According to the related art, a technique for detecting a whitening event using an aerial hyperspectral image has been disclosed. A technology disclosed in Korean Patent Registration No. 10-1672291 relates to a method for detecting a whitening event using an aerial hyperspectral image, and it is necessary to prepare in advance an image library about a whitening event to be compared with a photographed hyperspectral image. However, there is a problem in that when the image library is generated once, it is difficult to be extended, it takes a lot of time to configure a huge library, and it takes a lot of load to take the huge library

DISCLOSURE

Technical Problem

An object to be solved by the present invention is to provide a system for detecting and identifying a marine object capable of preprocessing and processing in real time hyperspectral data collected from the air in real time.

Another object to be solved by the present invention is to provide a system capable of controlling how much throughput is allocated to any system based on a communication status and a processing capability between a system in the air and a system on the ground.

Yet another object to be solved by the present invention is to provide a method for recognizing a marine object included in hyperspectral data to be collected in real time using artificial intelligence-based clustering and a system using the same.

Technical Solution

According to an embodiment of the present invention, a method for recognizing a marine object based on hyperspectral data may be configured to include collecting target hyperspectral data; preprocessing the target hyperspectral data; and detecting and identifying an object included in the target hyperspectral data based on a marine object detection and identification model, trained through learning of the detection and identification of the marine object.

As the collecting of the target hyperspectral data is performed in real time, subsequent steps may be performed in real time in conjunction with this step.

The preprocessing of the target hyperspectral data may be configured to include at least one of radiating correction, atmospheric correction, and geometric correction of the target hyperspectral data.

The method for recognizing the marine object based on the hyperspectral data may be configured to further include generating learning data of the marine object detection and identification model; and training the marine object detection and identification model through the learning using the learning data.

The generating of the learning data may be configured to include configuring a learning dataset for identifying the marine object using hyperspectral data; analyzing the dataset using an analysis algorithm; managing pixels constituting the object using the analysis result; and constructing the learning data using the pixel data.

The analyzing of the dataset may be configured to include pre-screening hyperspectral data using a machine learning algorithm; detecting a marine object based on the pre-screening result; and identifying the detected marine object.

The pre-screening may be configured to include analyzing the density of a cluster while changing parameters for the formation of the marine object cluster.

The detecting of the marine object may be configured to include removing data of a seawater area from the hyperspectral data based on the density of the marine object.

The identifying of the marine object may be configured to further include detecting noise formed by an object out of the cluster using a clustering algorithm.

The identifying of the marine object may be configured to include identifying the marine object based on coordinate values and a spectrum of pixels corresponding to the noise.

The managing of the pixels may be configured to include labeling pixels formed by the marine object.

In addition, the constructing of the learning data may be configured to include classifying pixel data formed by the labeled marine object; and constructing an integrated library using the classified pixel data.

The preprocessing and data processing for object detection and identification may be performed by at least one of the first subsystem in the sky and the second subsystem on the ground.

The method for recognizing the marine object based on the hyperspectral data may further include detecting a communication state between the first subsystem and the second subsystem; and comparing the communication state with a processing speed of the first subsystem and the second subsystem, wherein an amount and a subject of data to be processed in the first subsystem and the second subsystem may be determined according to the comparison result.

The method for recognizing the marine object based on the hyperspectral data may further include changing a data processing subject or changing a data processing ratio between the first subsystem and the second subsystem according to the change in the communication state.

According to another embodiment of the present invention, a system for recognizing a marine object based on hyperspectral data may be configured to include an object identification unit configured to identify and detect an object using collected target hyperspectral data; a first subsystem and a second subsystem configured to include commonly a preprocessing unit for correcting the target hyperspectral data; and a control unit configured to detect a communication state between the first subsystem and the second subsystem and compare the communication state with a processing speed of the first subsystem and the second subsystem.

The control unit may determine an amount and a subject of data to be processed in the first subsystem and the second subsystem according to the comparison result. Here, the control unit may be included in at least one of the first subsystem and the second subsystem.

The specific details of other embodiments are included in the "the detailed description of the invention" and the accompanying "drawings".

Advantages and/or features of the present invention, and a method for achieving the advantages and/or features will become obvious with reference to embodiments to be described below in detail together with the accompanying drawings.

However, the present invention is not limited only to a configuration of each embodiment to be disclosed below, but may also be implemented in various different forms. The respective embodiments disclosed in this specification are provided only to complete disclosure of the present invention and to fully provide those skilled in the art to which the present invention pertains with the category of the invention, and the present invention will be defined only by the scope of each claim of the claims.

Advantageous Effects

According to the present invention, the preprocessing and processing of the hyperspectral data collected in real time according to a communication state may be performed in the air or on the ground.

In addition, the marine object detection model and identification model completed in the system on the ground can be loaded into the system in the air to be used for detection and identification of the marine object, and the performance can be upgraded through re-learning in the system on the ground.

In addition, it is possible to reduce the time required for identifying marine objects compared to seawater by using hyperspectral data, and also increase an identification rate.

In addition, according to the accumulation of the hyperspectral data, it is possible to learn and relearn a hyperspectral data-based marine object recognition model that recognizes marine objects shown as noise in machine learning clustering.

BEST MODE FOR THE INVENTION

Figure 1:
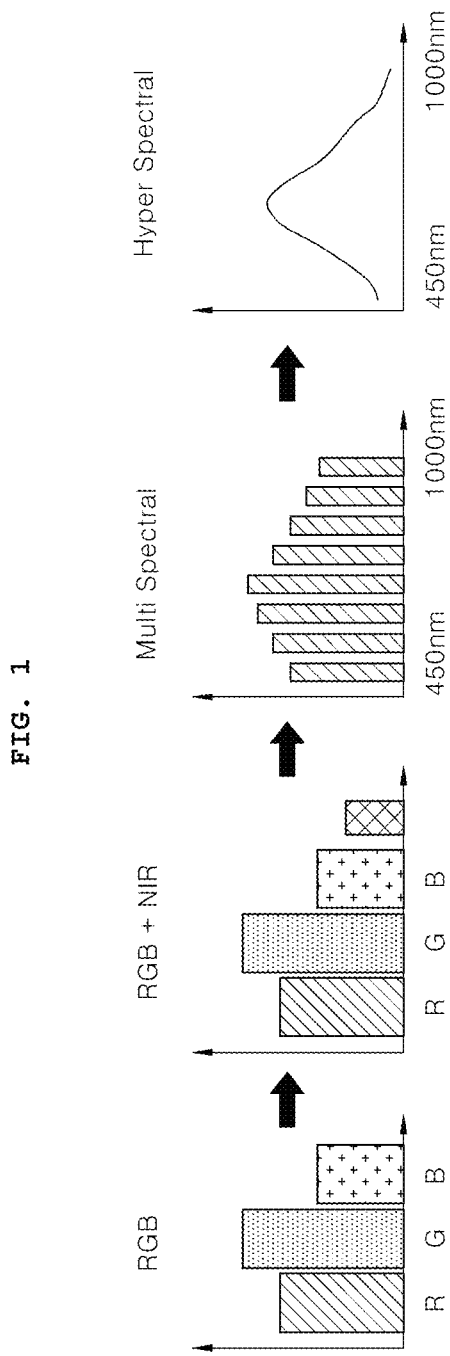
FIG. 1 is an exemplary diagram for describing hyperspectral data according to an embodiment of the present invention.

The present invention provides a system for detecting and identifying a marine object capable of preprocessing and processing in real time hyperspectral data collected from the air in real time.

MODES FOR THE INVENTION

Before describing the present disclosure in detail, terms or words used in this specification should not be construed as unconditionally limited to a conventional or dictionary meaning, and the inventors of the present disclosure can appropriately define and use the concept of various terms in order to describe their invention in the best method. Furthermore, it should be understood that these terms or words should be interpreted as meanings and concepts consistent with the technical idea of the present disclosure.

That is, the terms used in the present disclosure are only used to describe a preferred embodiment of the present invention, and are not intended to specifically limit the contents of the present invention, and it should be noted that these terms are terms defined in consideration with various possibilities of the present invention.

In addition, in this specification, it should be understood that the singular expression may include a plural expression unless clearly indicated in another meaning in the context, and even if similarly expressed in the plural, the singular expression may include the meaning of the singular number.

Throughout the present disclosure, when a component is described as "including" the other component, the component does not exclude any other component, but may further include any other component unless otherwise indicated in contrary.

Furthermore, when it is described that a component is "inserted or connected into" the other component, this component may be directly connected or in contact with the other component, and may be spaced apart from the other component at a predetermined distance. In addition, when a component is spaced apart from the other component at a predetermined distance, a third component or means may exist to fix and connect the corresponding component to the other component and the description of the third component or means may also be omitted.

On the contrary, when it is described that a component is "directly connected to" or "directly accesses" the other component, it should be understood that a third component or means does not exist.

Similarly, other expressions describing a relationship between components, that is, expressions such as "between" and "directly between" or "adjacent to" and "directly adjacent to" should be similarly interpreted.

In addition, in the specification, the terms such as "one surface", "the other surface", "one side", "the other side", "first", "second", etc., are used to clearly distinguish one component from the other component with respect to one component.

In addition, in this specification, it should be understood that terms related to positions such as "upper", "lower", "left", and "right" are used to indicate relative positions with respect to the corresponding component in the drawing, and unless an absolute position is specified with respect to their positions, these position-related terms should not be construed as referring to an absolute position.

In addition, in this specification, in specifying the reference numerals for each component in each drawing, like reference numerals indicate like components throughout the specification, so that the same components has the same reference number even if it is shown in different drawings.

In the drawings appended to this specification, a size, a position, a coupling relationship, etc. of each component constituting the present disclosure may be described while being partially exaggerated, reduced, or omitted for sufficiently clearly delivering the spirit of the present disclosure or for the convenience of description, and thus, the proportion or scale thereof may not be exact.

Further, hereinafter, in the following description of the present invention, a detailed description of a configuration determined to unnecessarily obscure the subject matter of the present invention, for example, a known technology including the related art may also be omitted.

Hereinafter, embodiments of the present invention will be described in detail with reference to the related drawings.

FIG. 1 is an exemplary diagram for describing hyperspectral data according to an embodiment of the present invention.

Referring to FIG. 1, examples of data that may be collected using various image sensors are shown. An image sensor included in a general camera describes an appearance of an object by using RGB data based on visible light among various areas of light according to a wavelength. A near-infrared (NIR) sensor may additionally generate NIR data based on near-infrared rays in addition to the RGB data. In addition, there may be an image sensor that generates multiple data based on multi-spectral, for example, light having a wavelength of a certain range within a range of 450 nm to 1000 nm as illustrated in FIG. 1.

The hyperspectral data according to the embodiment of the present invention is characterized as, for example, sensing data generated based on light having a wavelength in a continuous range of 450 nm to 1000 nm.

The hyperspectral data according to the embodiment of the present invention may be collected through a vehicle such as an airplane, a drone, or a helicopter using a camera mounted with a hyperspectral image sensor, but it is not limited thereto, it is not excluded that the hyperspectral data may be collected in a wider range of space, that is, by artificial satellites.

In the range of a subject of the hyperspectral data according to the embodiment of the present invention, the land as well as the ocean may be included. Accordingly, various aspects of the embodiment of the present invention may be applied to object recognition based on images photographed from a subject and a remote location without distinguishing the sea and the land.

Figure 2:
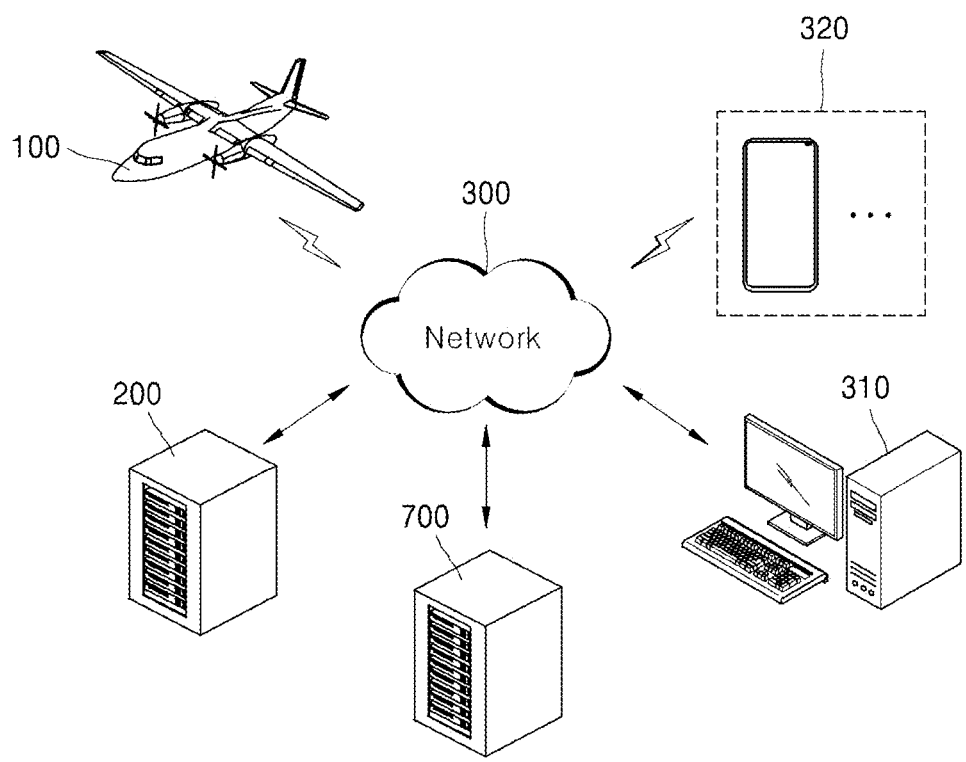
FIG. 2 is a network relationship diagram of a system for recognizing a marine object according to an embodiment of the present invention.

FIG. 2 is a network relationship diagram of a system for recognizing a marine object according to an embodiment of the present invention.

Referring to FIG. 2, a system for recognizing a marine object of performing a method for recognizing a marine object according to an embodiment of the present invention is illustrated.

A system 10 for recognizing a marine object according to an embodiment of the present invention may be configured to include a first subsystem 100 mounted on an aircraft and the like and operated even in the air, a second subsystem 200 on the ground, a hyperspectral data analysis apparatus 700, a desktop 310 corresponding to a client capable of being connected thereto via communication, a user terminal 320, and a network 400.

The system 10 for recognizing the marine object based on the hyperspectral data (hereinafter, a marine object recognition system) may be divided and configured into a first subsystem 100 and a second subsystem 100. The first subsystem 100 may be installed in an aircraft device such as an airplane, a drone, a helicopter, and the like, and the second subsystem 200 may be installed on the ground. The first subsystem 100 and the second subsystem 200 may communicate with each other via the network 400.

The first subsystem 100 functions to collect hyperspectral data in real time, and both the first subsystem 100 and the second subsystem 200 may perform a function of processing the collected hyperspectral data.

The first subsystem 100 may be configured to include one or more devices, that is, servers. In addition, the second subsystem 200 may be configured to include one or more devices, that is, servers.

The hyperspectral data analysis device 700 may process hyperspectral data by executing instructions including codes for the method for recognizing the hyperspectral data for identifying the marine object. The hyperspectral data analysis apparatus 700 functions to generate learning data for a marine object detection model and a marine object identification model according to an embodiment of the present invention. In addition, the first subsystem 100 and the second subsystem 200 may perform the same function as the hyperspectral data analysis apparatus 700.

The desktop 310 may be connected to the hyperspectral data analysis apparatus 700 for identifying the marine object via a wired network to control its operation.

The user terminal 320 may be connected to the hyperspectral data analysis apparatus 700 for identifying the marine object via a wireless network to control its operation.

The network 400 may be any suitable communication network, including wired and wireless networks, such as serial communication, a local area network (LAN), a wide area network (WAN), Internet of TCP/IP, Intranet, and Extranet, and mobile networks, such as cellular, 3G, LTE, 5G, WiFi network, ad hoc network, and combinations thereof.

The network 400 may include connection of network elements such as hubs, bridges, routers, switches, and gateways. The network 400 may include one or more connected networks, for example, a multi-network environment, including a public network such as an internet and a private network such as a safe corporate private network. The access to the network 400 may be provided via one or more wired or wireless access networks.

Figure 3:
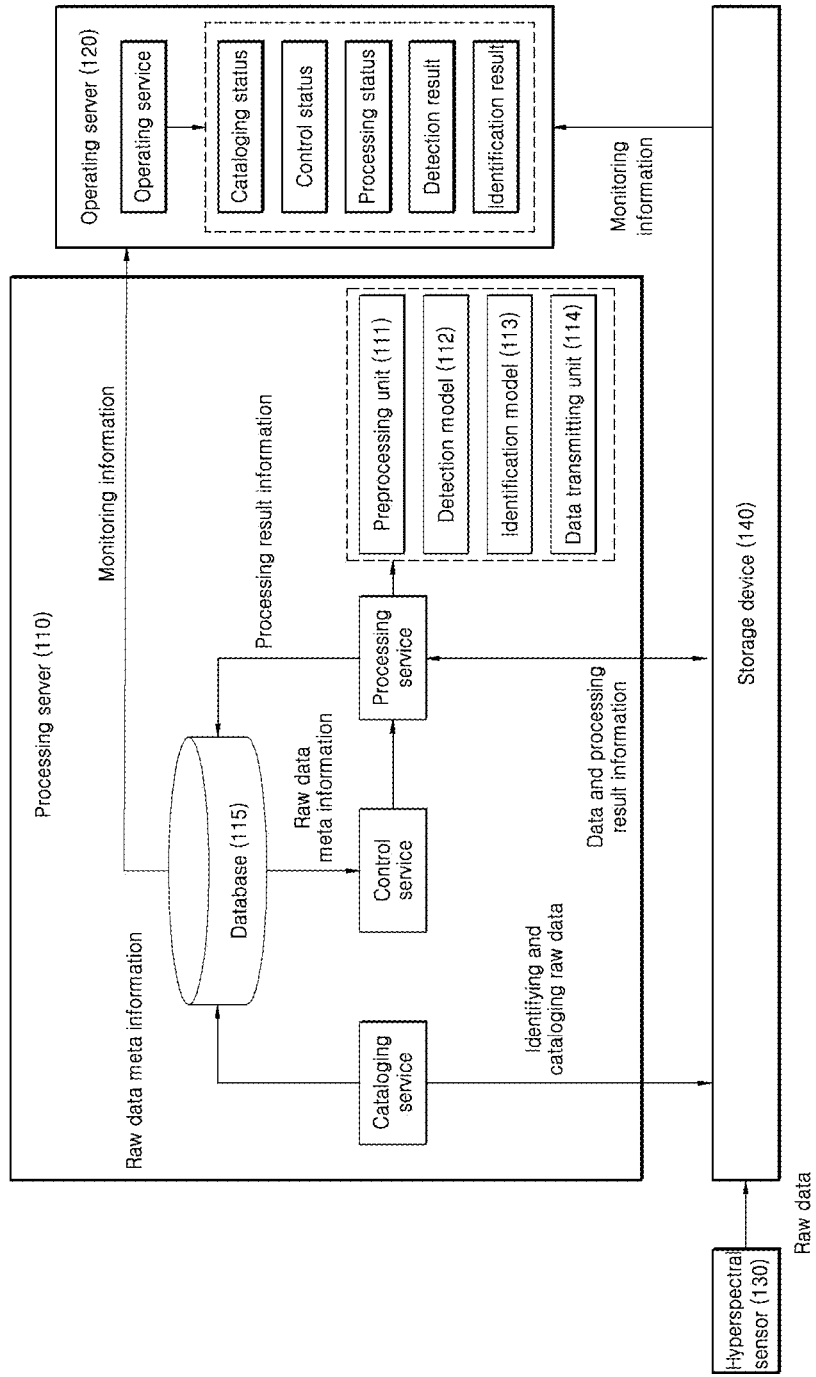
FIG. 3 is a block diagram of a first subsystem in the system for recognizing the marine object according to an embodiment of the present invention.

FIG. 3 is a block diagram of a first subsystem in the marine object recognition system.

Referring to FIG. 3, the first subsystem 100 may be implemented using a plurality of servers. The first subsystem 100 is a configuration server, and includes a processing server 100 and an operating server 120, and may further include a hyperspectral sensor 130 and a storage device 140.

The processing server 110 may be configured to include a preprocessing unit 111, a detection model 112, an identification model 113, a data transmitting unit 114, and a database 115.

The operating server 120 may provide an operating service related to a cataloging status, a control status, a processing status, a detection result and an identification result by using monitoring information.

The hyperspectral sensor 130 functions to collect hyperspectral data with respect to the ocean and the land as subjects in the sky. Collected hyperspectral raw data may be stored in the storage device 140, and then transmitted to the second subsystem 200 by the data transmitting unit 114.

The database 115 may store raw data meta information and processing result information.

Figure 4:
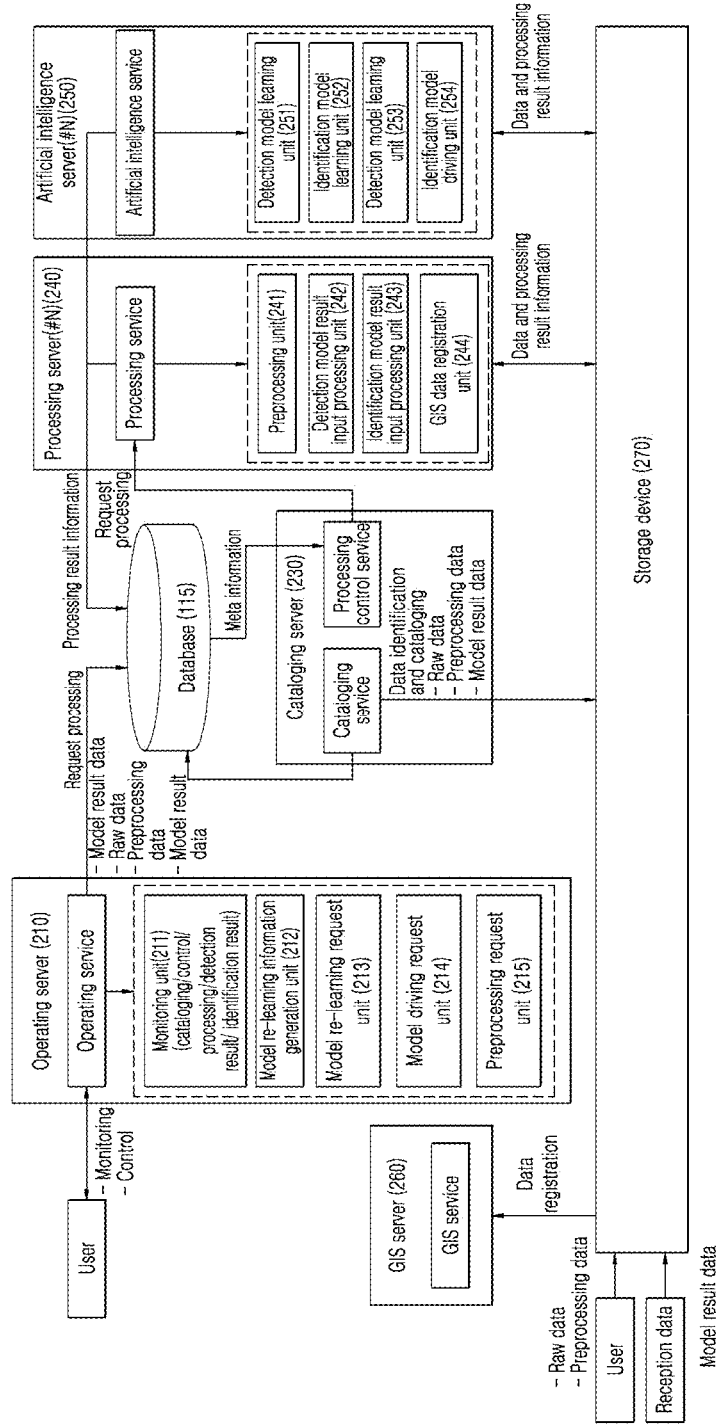
FIG. 4 is a block diagram of a second subsystem in the system for recognizing the marine object according to an embodiment of the present invention.

FIG. 4 is a block diagram of a first subsystem in the marine object recognition system.

Referring to FIG. 4, the second subsystem 200 may be implemented using a plurality of servers. The second subsystem 200 is a configuration server, and may be configured to include an operating server 210, a database 220, a processing server 230, an artificial intelligence server 250, a GIS server 260, and a storage device 270.

The operating server 210 may be configured to include a monitoring unit 211, a model re-learning information generation unit 212, a model re-learning request unit 213, and a preprocessing request unit 215. The operating server 210 may monitor an overall process related to processing, reception, and storage of the data, and generate information for re-learning of the detection model and the identification model.

The model re-learning information generation unit 212 functions to generate information required for the re-learning of the model. In this sense, the model re-learning information generation unit 212 may include a dataset configuration unit 762, a data analysis unit 763, a pixel management unit 764, and a learning data generation unit 765, which are included in the data analysis apparatus 700, or may perform their functions.

The re-learning request unit 213 may request the artificial intelligence server 250 to re-learn the detection model and the identification model.

The preprocessing request unit 215 may request the processing server 240 to preprocess the hyperspectral data.

The database 220 may store meta information, raw data, preprocessing data, model result data, and the like, and manage these data.

The cataloging server 230 provides a cataloging service and a processing control service to the user. The processing control service functions to control the processing server 240.

The cataloging service is a service for identifying raw data, preprocessing data, and model result data, and retrieving the data. The user may retrieve data including a specific scene for each data type through the cataloging service.

The processing server 240 performs preprocessing and processing of the hyperspectral data. The processing server 240 may be configured to include a preprocessing unit 241, a detection model result input processing unit 242, an identification model result input processing unit 243, and a GIS data registration unit 244.

The artificial intelligence server 250 functions to learn the detection model and the identification model and to drive the learned models. The artificial intelligence server 250 may be configured to include a detection model learning unit 251, an identification model learning unit 252, a detection model driving unit 253, and an identification model driving unit 254.

The GIS server 260 is also called a geoserver, and provides various types of information, such as maps, diagrams, and pictures, to users by integrating and managing location data and attribute data for an object having a geographical location.

The first subsystem 100 and the second subsystem 200 configured to include the plurality of servers have been described above. However, the first subsystem 100 and the second subsystem 200 may also be configured as a single server. Hereinafter, examples of the first subsystem 500 and the second subsystem 600 configured as a single server will be described for convenience of description.

Figure 5:
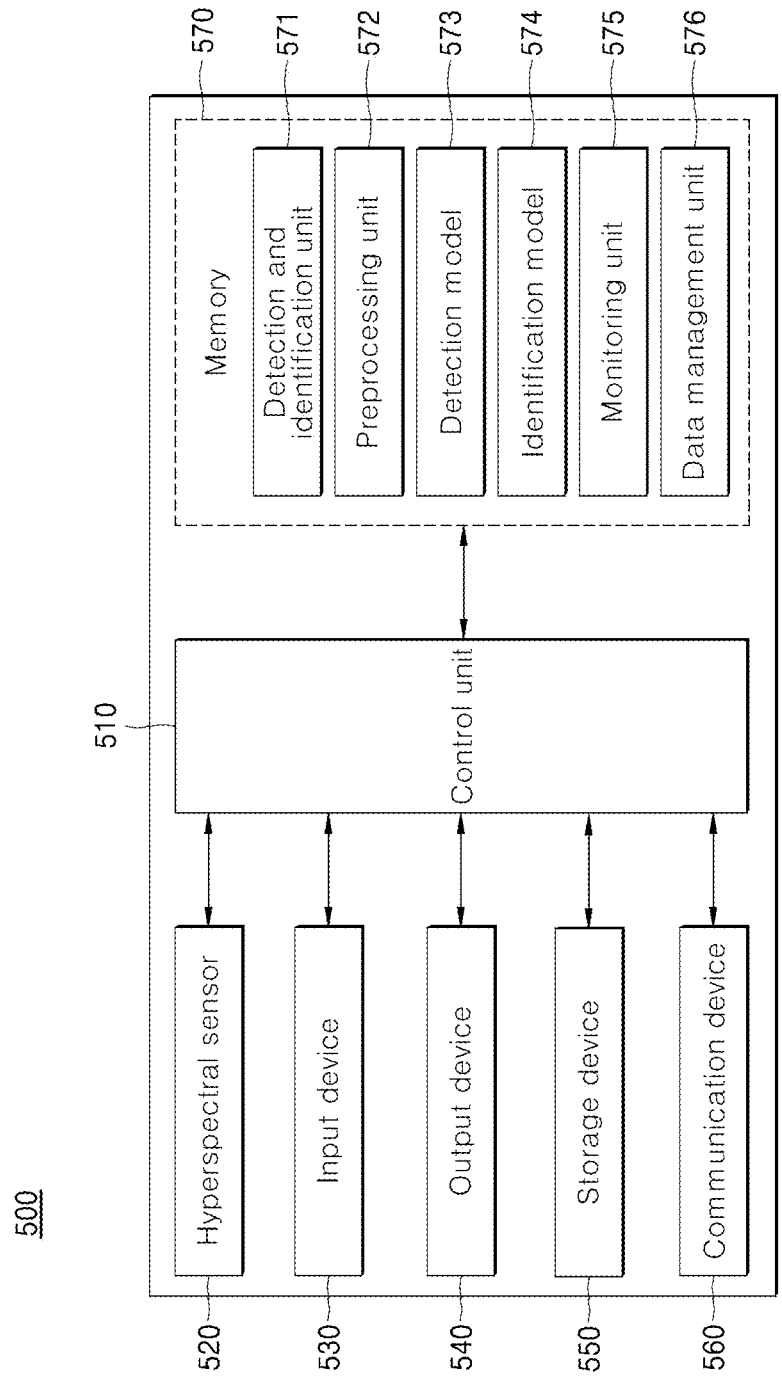
FIG. 5 is a block diagram of a first subsystem in the system for recognizing the marine object according to an embodiment of the present invention.

FIG. 5 is a block diagram of a first subsystem in the marine object recognition system.

Referring to FIG. 5, the first subsystem 500 may be implemented by a single system. The first subsystem 500 may be configured to include a control unit 510, a hyperspectral sensor 520, an input device 530, an output device 540, a storage device 550, a communication device 560, and a memory 170. In addition, the memory 170 may be configured to include a detection and identification unit 571, a preprocessing unit 572, a detection model 573, an identification model 574, a monitoring unit 575, and a data management unit 576.

Components included in the first subsystem 500 correspond to the first subsystem 100, the server, and components included therein.

Figure 6:
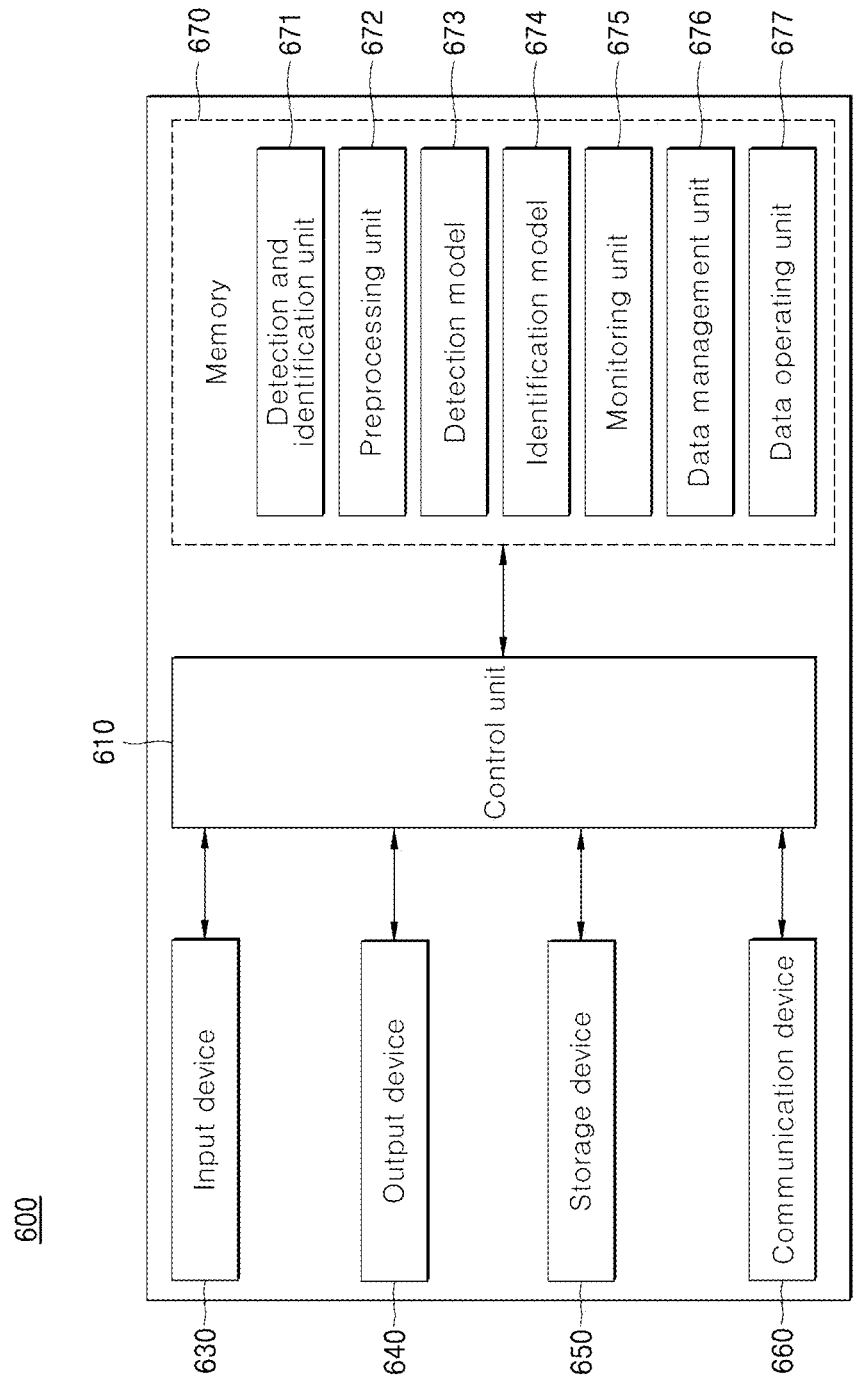
FIG. 6 is a block diagram of a second subsystem in the system for recognizing the marine object according to an embodiment of the present invention.

FIG. 6 is a block diagram of a second subsystem in the marine object recognition system.

Referring to FIG. 6, the second subsystem 600 may be implemented by a single system. The second subsystem 600 may be configured to include a control unit 610, an input device 630, an output device 640, a storage device 650, a communication device 660, and a memory 670. In addition, the memory 670 may be configured to include a detection and identification unit 671, a preprocessing unit 672, a detection model 673, an identification model 674, a monitoring unit 675, a data management unit 676, and a data operating unit 677.

Components included in the second subsystem 600 correspond to the second subsystem 200, the server, and components included therein.

The control unit 510 in FIG. 5 and the control unit 610 in FIG. 6 detect a communication state between the first subsystem 100 and the second subsystem 200, and may compare the communication state with the processing speed of the first subsystem 100 and the second subsystem 200.

In addition, the control units 510 and 610 determine the amount and subject of data to be processed in the first subsystem and the second subsystem according to the comparison result.

Figure 7:
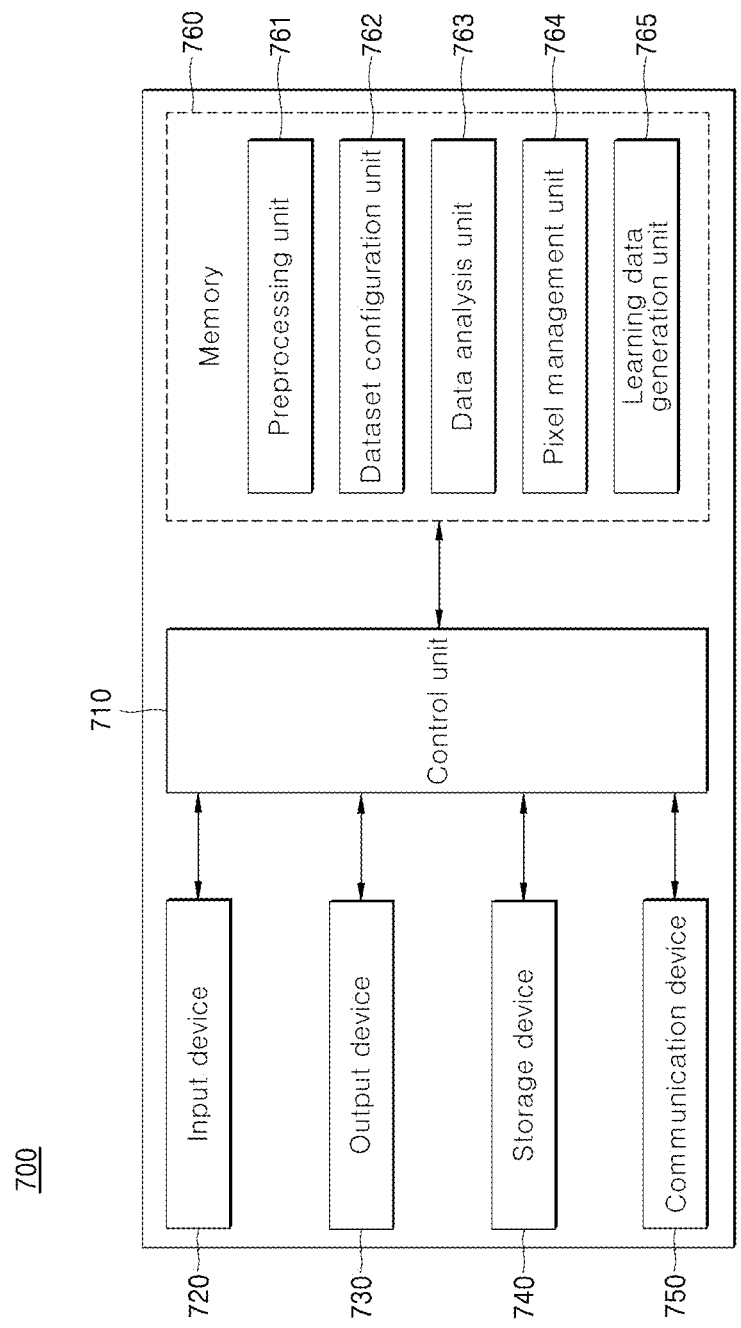
FIG. 7 is a block diagram of a hyperspectral analysis apparatus according to an embodiment of the present invention.

FIG. 7 is a block diagram of an apparatus for processing hyperspectral data for identifying a marine object according to an embodiment of the present invention.

Referring to FIG. 7, the hyperspectral data analysis apparatus 700 for identifying the marine object may be configured to include an input device 720, an output device 730, a storage device 740, a communication device 750 and a memory 760.

The memory 760 may be configured to include a preprocessing unit 761, a dataset configuration unit 762, a data analysis unit 763, a pixel management unit 764, and a learning data generation unit 765.

The preprocessing unit 761 has a preprocessing function of the hyperspectral data through interactions such as data transmission, storage, reception, interrupt call, and the like between the control unit 710, for example, a processor and the memory 760.

The dataset configuration unit 762 has a function of configuring a dataset using the hyperspectral data through interactions such as data transmission, storage, reception, interrupt call, and the like between the control unit 710, for example, a processor and the memory 760.

The data analysis unit 763 has a function of analyzing the hyperspectral data through interactions such as data transmission, storage, reception, interrupt call, and the like between the control unit 710, for example, a processor and the memory 760.

The pixel management unit 764 has a function of managing pixels extracted from the hyperspectral data through interactions such as data transmission, storage, reception, interrupt call, and the like between the control unit 710, for example, a processor and the memory 760.

The learning data generation unit 765 has a function of generating learning data of a marine object detection and identification model through interactions such as data transmission, storage, reception, interrupt call, and the like between the control unit 710, for example, a processor and the memory 760.

Hereinafter, a method for recognizing a marine object according to an embodiment of the present invention will be described. A subject executing the method for recognizing the marine object may be at least one of the first subsystem 100, the second subsystem 200, and the data analysis apparatus 700 in FIG. 2. That is, the learning data through the preprocessing and processing of the hyperspectral data may be generated by the first subsystem 100, the second subsystem 200, and the data analysis apparatus 700. Hereinafter, data preprocessing and processing will be described using the data analysis apparatus 700 as a representative example.

Figure 8:
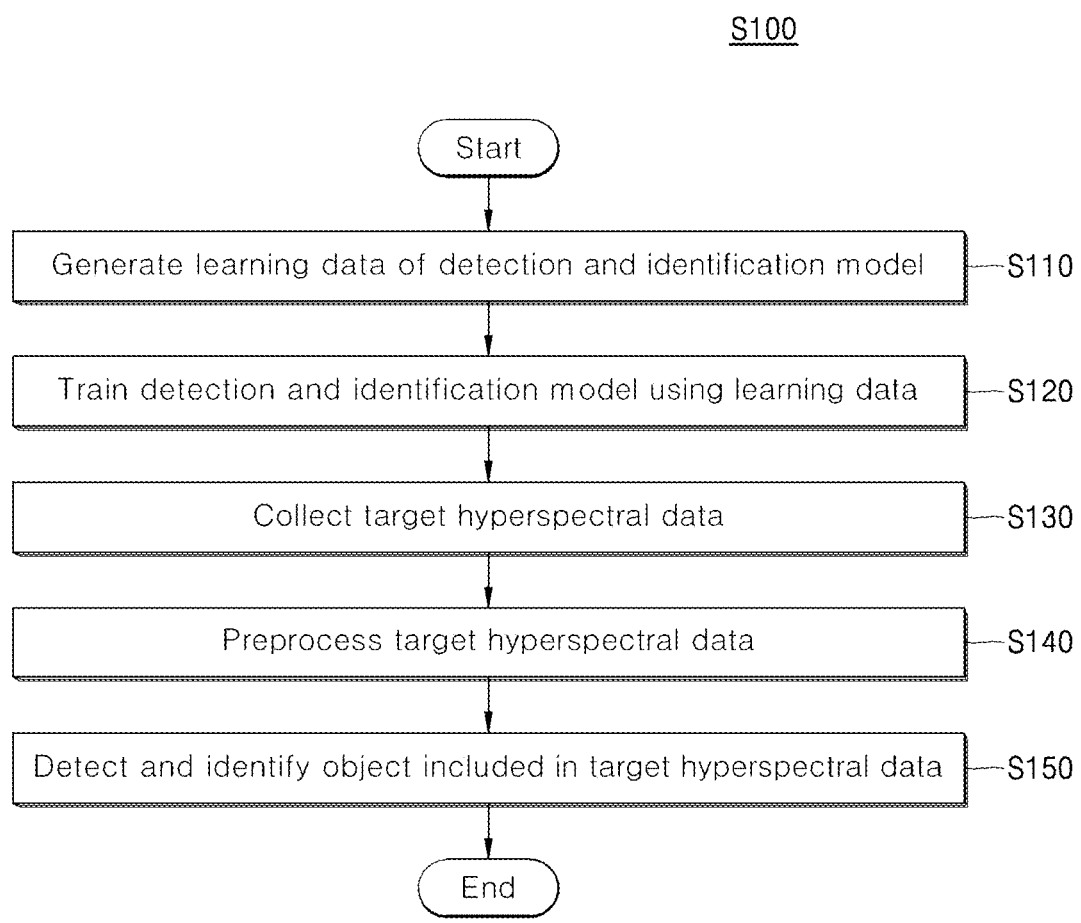
FIG. 8 is a flowchart of a method for recognizing a marine object according to an embodiment of the present invention.

FIG. 8 is a flowchart of a method for recognizing a marine object according to an embodiment of the present invention.

Referring to FIG. 8, the method for recognizing the marine object (S100) may be configured to include generating learning data of the detection and identification model (S110), training the detection and identification model using the learning data (S120), collecting target hyperspectral data (S130), preprocessing the target hyperspectral data (S140), and detecting and identifying an object included in the target hyperspectral data (S150).

In step S110, the hyperspectral data analysis apparatus 700 may generate the learning data of the marine object detection and identification model.

In step S120, the hyperspectral data analysis apparatus 700 may train the marine object detection and identification model through learning using the learning data.

In step S130, the hyperspectral data processing apparatus 700 may collect the target hyperspectral data. The target hyperspectral data is hyperspectral data to be detected and identified. The target hyperspectral data may be collected by the first subsystem 100 flying in the sky, and then transmitted to the second subsystem 200 or the data analysis device 700.

In step S140, the hyperspectral data processing apparatus 700 may preprocess the target hyperspectral data. The preprocessing may include correction of hyperspectral data, for example, radiating correction, atmospheric correction, and geometric correction.

In step S150, the hyperspectral data analysis apparatus 700 may detect and identify the object included in the target hyperspectral data based on the marine object detection and identification model, trained through the learning of the detection and identification of the marine object.

Here, the preprocessing (S140) and the data processing for detecting and identifying the object (S150) may be performed by at least one of the first sub-system 500 in the sky and the second sub-system 600 on the ground.

In addition, the control units 510 and 610 detect a communication state between the first subsystem 500 and the second subsystem 600, and may compare the communication state with the processing speed of the first subsystem 500 and the second subsystem 600.

In addition, according to the comparison result, the amount and subject of data to be processed in the first subsystem 500 and the second subsystem 600 may be determined. For example, when the communication state between the first subsystem 500 and the second subsystem 600 is good, for example, when the data transmission rate is greater than or equal to a threshold value, the entire collected hyperspectral data may be transmitted to the second subsystem 600, and the second subsystem 600 may perform preprocessing and data processing.

On the contrary, if the communication state is poor, that is, the data transmission rate is equal to or smaller than the threshold value, only a part of the collected hyperspectral data may be transmitted to the second subsystem 600, or the preprocessing and data processing for the entire hyperspectral data collected without transmission may be performed in the first subsystem 500.

Thereafter, according to a change in the communication state, that is, a change in circumstance, the control units 510 and 610 may change the data processing subject or change the data processing ratio between the first subsystem 500 and the second subsystem 600.

Hereinafter, the generating of the learning data of the marine object detection and identification model (S110) will be described in detail.

Figure 9:
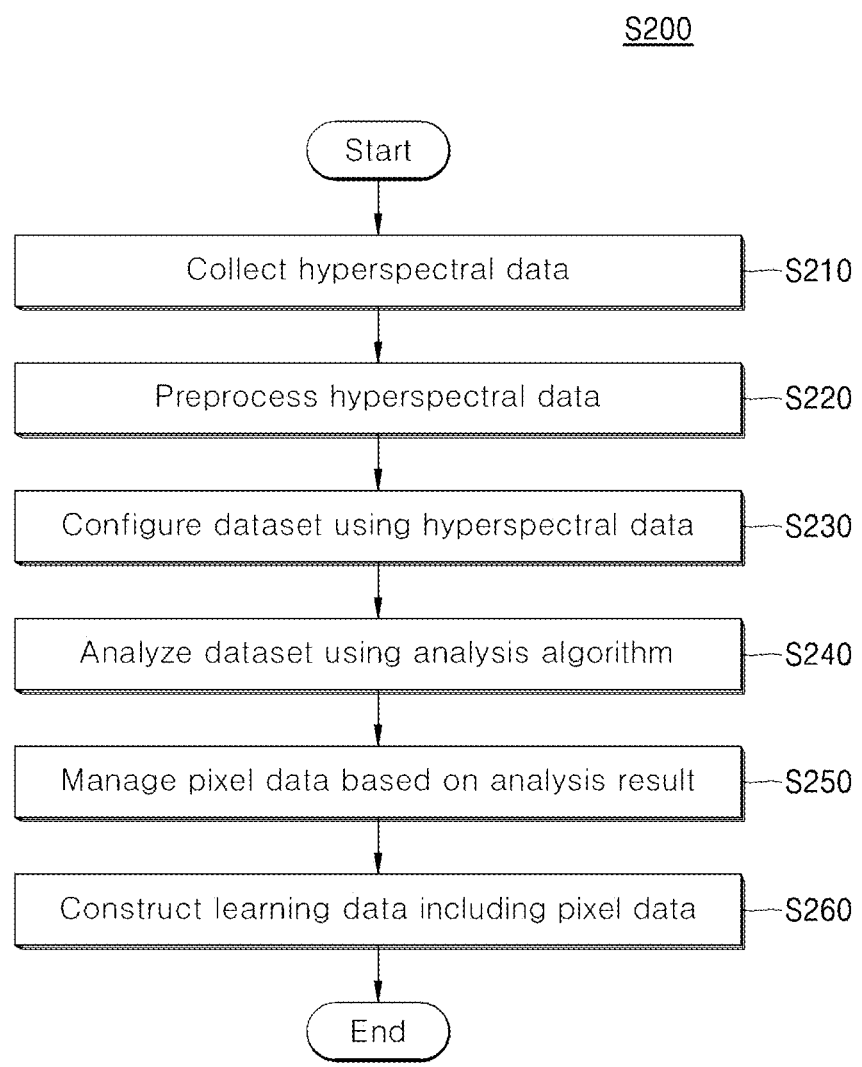
FIG. 9 is a flowchart of a method for recognizing a marine object according to an embodiment of the present invention.

FIG. 9 is a flowchart of a method for recognizing a marine object according to an embodiment of the present invention.

Referring to FIG. 9, a method for recognizing a marine object (S200), that is, a method for generating learning data may be configured to include collecting hyperspectral data (S210), preprocessing the hyperspectral data (S220), configuring a dataset using the hyperspectral data (S230), analyzing the dataset using an analysis algorithm (S240), managing pixel data based on the analysis result (S250), and constructing learning data included in the pixel data (S260).

In step S210, the apparatus 700 for analyzing hyperspectral data (hereinafter, a hyperspectral data analyzing apparatus) may collect hyperspectral data through marine photographing in which various objects to be used for learning an object identification model are shown. Here, the concept of the collection may include a "receiving" action. Accordingly, according to a user input, the hyperspectral data analyzing apparatus 700 may receive the hyperspectral data from various hyperspectral data sources connected to the network 400.

In step S220, the hyperspectral data analyzing apparatus 700 may preprocess the hyperspectral data. The hyperspectral data cannot always be collected in the presence of sufficient light because the quality thereof is sensitive to the altitude of the sun, the presence and amount of clouds, and changes in the weather at the time of collection. Accordingly, the collected hyperspectral data may be subjected to various corrections, for example, radiating correction, atmospheric correction, and geometric correction through the preprocessing process.

In step S230, the hyperspectral data analyzing apparatus 700 may configure a learning dataset for marine object recognition using the hyperspectral data.

The hyperspectral data analyzing apparatus 700 may select a data file, set an analysis range of the data file, and convert the data file.

For example, the hyperspectral data analyzing apparatus 700 may visualize the hyperspectral data as an image by using data in a visible light area included in the hyperspectral data. For example, a rectangular range of two X-axis points and two Y-axis points may be set as an analysis area, and hyperspectral data of the selected area may be visualized. The reason for visualization includes increasing operation efficiency of a user. The hyperspectral data may be converted into a DMT image, an HIS image, a binary image, and the like for analysis. In addition, the hyperspectral data may be converted into an HDR image form to increase the range of brightness.

In step S240, the hyperspectral data analyzing apparatus 700 may analyze the dataset using an analysis algorithm. The analyzing of the dataset corresponds to a process for detection and identification of the marine object. The detection of the marine object means detecting the presence of a marine object, and the identification of the marine object means detecting the identity of the detected object. The analyzing of the dataset will be described in detail with reference to FIG. 5.

Figure 10:
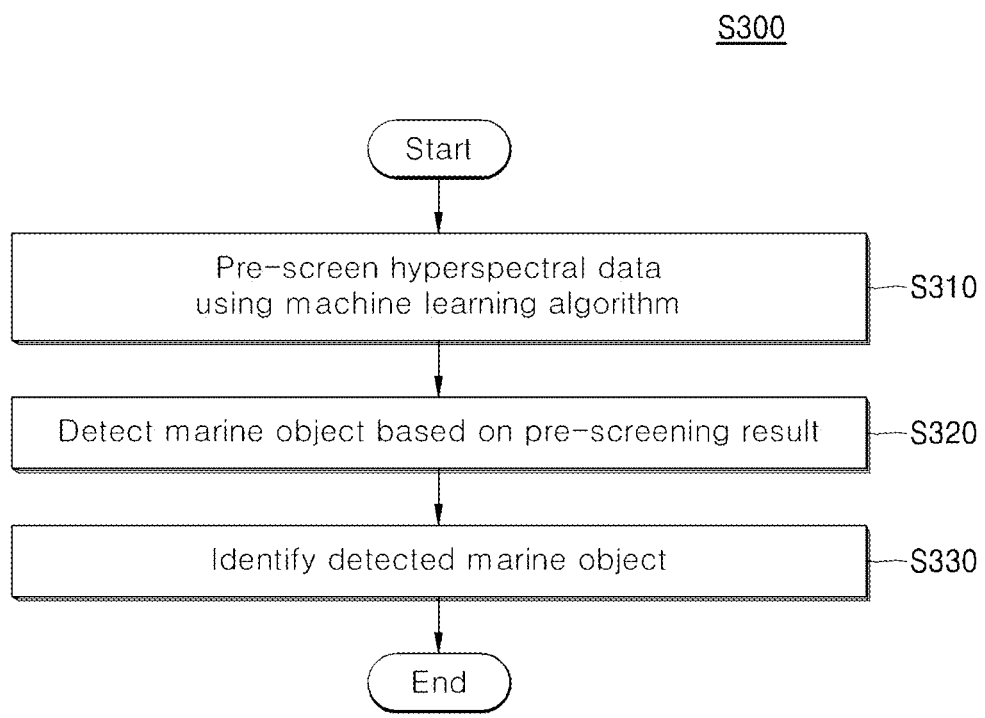
FIG. 10 is a flowchart of a method for recognizing a marine object according to an embodiment of the present invention.

FIG. 10 is a flowchart of a method for recognizing a marine object based on hyperspectral data according to an embodiment of the present invention.

Referring to FIG. 10, the analyzing of the dataset according to the embodiment of the present invention (S300) may be configured to include a pre-screening the hyperspectral data using a machine learning algorithm (S310), detecting a marine object based on the pre-screening result (S320), and identifying the detected marine object (S330).

In step S310, the data analyzing apparatus 700 may pre-screen the hyperspectral data using the machine learning algorithm. In an embodiment of the present invention, a density-based clustering technique may be used for clustering of marine objects. In particular, as an embodiment of the present invention, a density-based spatial clustering of applications with noise (DBSCAN) algorithm may be used.

The hyperspectral data analyzing apparatus 700 may analyze the density of clusters while changing parameters for the cluster formation of marine objects. For example, the hyperspectral data analyzing apparatus 700 may analyze the cluster density according to a change in eps parameter, which is a parameter of the HDSCAN with respect to the cluster formation. Depending on the cluster density, the marine object may or may not belong to a cluster and may be detected as noise. In addition, by adjusting a min_samples parameter value corresponding to a minimum value belonging to the cluster, an arbitrary marine object may be included in the cluster or may also be treated as noise out of the cluster.

In addition, there are Cores and Scan Scale as parameters used in the embodiment of the present invention. Cores is a parameter related to a machine learning analysis rate and controls the number of cores used by the CPU. The Scan Scale is a parameter that specifies the analysis size of hyperspectral data that may be analyzed at once.

In the DBSCAN method, the speed multiplies every time the number of pixels increases, whereas when the number of pixels is too low, an appropriate cluster cannot be formed. Although this parameter is a parameter related to the speed of machine learning, the parameter may be implemented in consideration of a situation in which aerial image data is divided and computed into real-time or semi-real-time in the future.

In step S320, the hyperspectral data analyzing apparatus 700 may detect the marine object based on the pre-screening result.

For example, the hyperspectral data analyzing apparatus 700 may remove data of the seawater area from the hyperspectral data based on the density of the marine object. The seawater may form one marine object in the hyperspectral data. Accordingly, the seawater corresponds to a cluster including the largest number of pixels only in so far as the seawater is treated as the marine object. Therefore, in order to identify an object, the hyperspectral data of the seawater area needs to be removed. Data on the most densely distributed seawater may be removed from marine hyperspectral data through density analysis.

In step S330, the hyperspectral data analyzing apparatus 700 may identify the detected marine object.

For example, the hyperspectral data analyzing apparatus 700 may detect noise formed by an object out of the cluster by using a clustering algorithm. In an embodiment of the present invention, pixels of an object included in the cluster may be displayed in white, and pixels of an object not included in the cluster may be displayed in black. Noise formed out of the cluster may be a subject.

The hyperspectral data analyzing apparatus 700 may identify a marine object based on coordinate values and a spectrum of pixels corresponding to noise. When analyzing the spectrum of the pixels in the noise area corresponding to the marine object, the pixels of the noise show a unique spectrum depending on a type of marine object, for example, a fishing boat, a life ring, a life buoy, and a life raft. Accordingly, the marine object may be identified based on the coordinate values and the spectrum of the pixels.

In step S250, the hyperspectral data analyzing apparatus 700 may manage the pixels constituting the object using the analysis result.

The hyperspectral data analyzing apparatus 700 may label pixels formed by the marine object. The hyperspectral data processed by the hyperspectral recognition method (S200) according to the embodiment of the present invention may be used for learning of a detection and identification model of detecting and identifying the marine object based on the machine learning algorithm. Accordingly, the detection and identification result of the marine object in the processing process may be stored in the pixels of the corresponding hyperspectral image through labeling.

In step S260, the hyperspectral data analyzing apparatus 700 may construct learning data using pixel data.

Here, the constructing of the learning data using the pixel data (S260) may be configured to include classifying the pixel data formed by the labeled marine object, and constructing an integrated library using the classified pixel data.

In addition, the hyperspectral data analyzing apparatus 700 may store a pixel spectrum in the integrated library. Accordingly, the integrated library may include coordinate value information of noise, identified marine object information, and pixel spectrum information for the hyperspectral data.

Hereinafter, an example screen of a UI of an application prepared to execute instructions including codes with respect to the hyperspectral data recognition method (S200) based on the hyperspectral data according to an embodiment of the present invention will be described.

Figure 11:
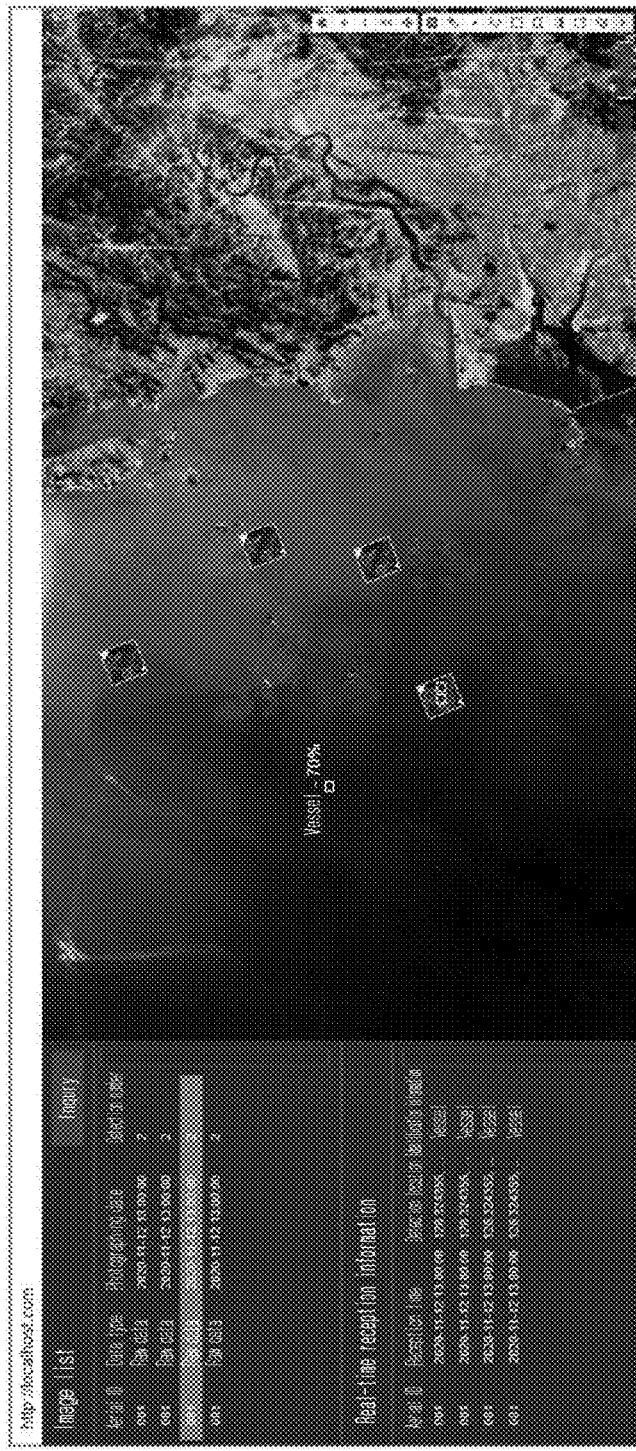
FIG. 11 is an example screen of an application UI implemented with a method for recognizing a marine object according to an embodiment of the present invention.

FIG. 11 is an example screen of an application UI implemented with a method for recognizing a marine object according to an embodiment of the present invention.

Referring to FIG. 11, hyperspectral data converted into a form that may be seen through the user's eyes is illustrated. An image list represents a dataset according to an embodiment of the present invention. In addition, the real-time reception information represents reception information on hyperspectral data received by the hyperspectral analysis apparatus 700.

Figure 12:
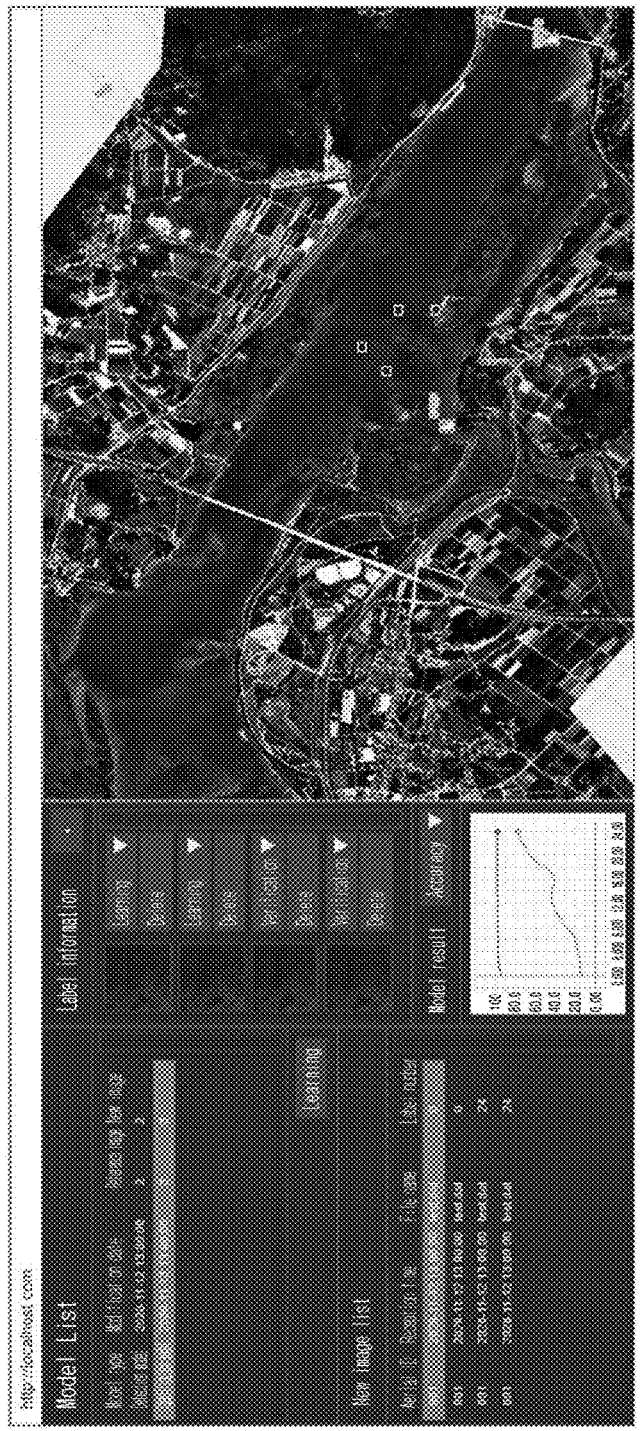
FIG. 12 is an example screen of an application UI implemented with a method for recognizing a marine object according to an embodiment of the present invention.

FIG. 12 is an example screen of an application UI implemented with a method for recognizing a marine object according to an embodiment of the present invention.

Referring to FIG. 12, the hyperspectral data according to an embodiment of the present invention may include the land as a subject. When the dataset is configured (S230), the hyperspectral data necessary for the operation is linked to the formed dataset. A coordinate side of an area to be analyzed is set, and for example, three bands are set in 127 bands of 400 nm to 900 nm, and a visualized image of the set area is displayed. Machine learning analysis is performed on the corresponding area, and in this case, EPS, Cores, and Scan Scale parameters may be set. The user may delete the dataset itself for further research using the UI, or remove only the learning data analyzed by machine learning.

Figure 13:
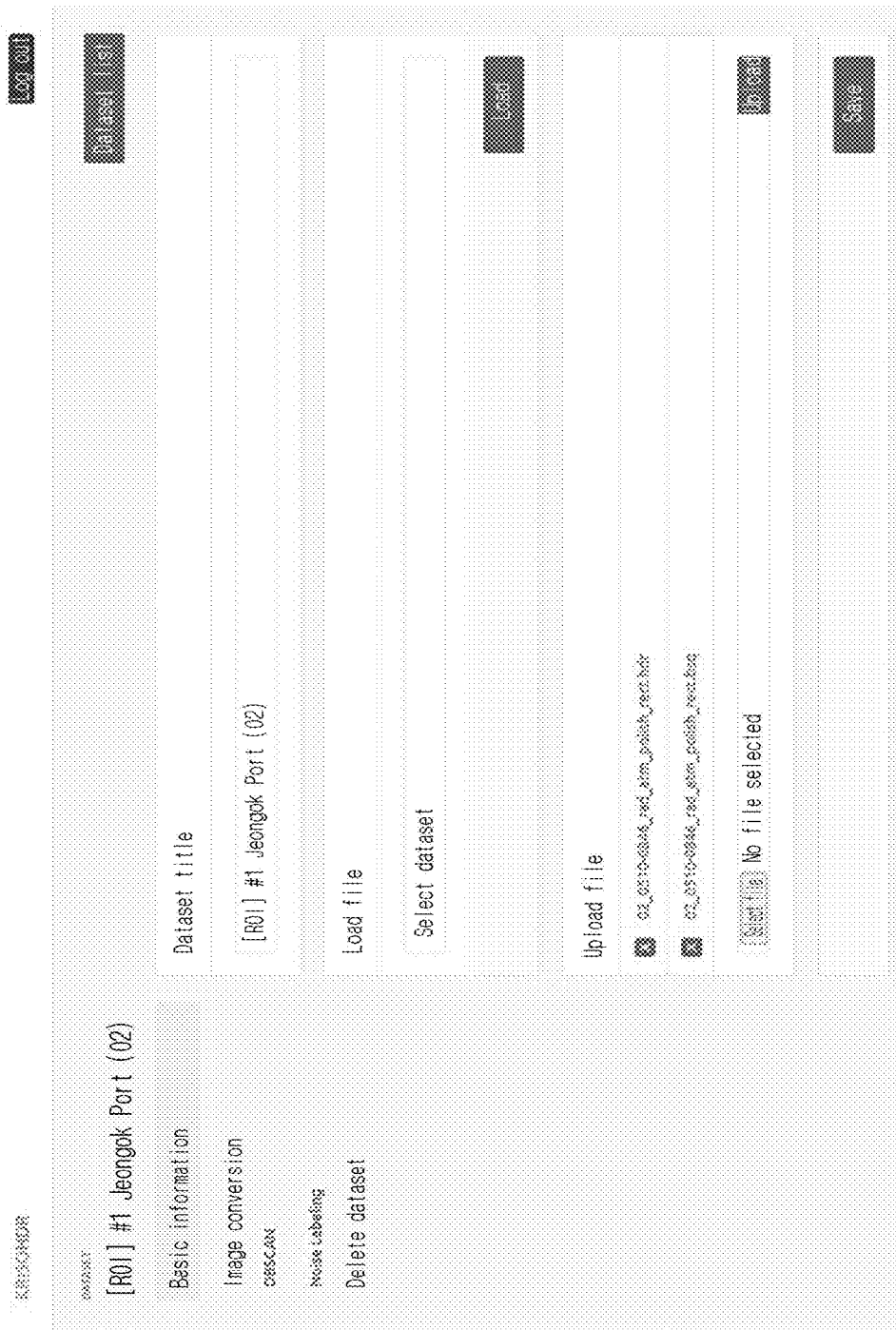
FIG. 13 is an example screen of an application UI for a dataset configuration in the method for recognizing the marine object according to an embodiment of the present invention.

FIG. 13 is an example screen of an application UI for a dataset configuration in the method for recognizing the marine object according to an embodiment of the present invention.

Referring to FIG. 13, processes such as registration of hyperspectral data, image conversion, and the like may be performed through the UI of the dataset configuration. FIG. 8 illustrates a dataset configuration using hyperspectral data collected in Jeongok Port.

Figure 14:
FIG. 14 is an example screen of an application UI for data conversion in the method for recognizing the marine object according to an embodiment of the present invention.

FIG. 14 is an example screen of an application UI for data conversion in the method for recognizing the marine object based on the hyperspectral data according to an embodiment of the present invention.

Referring to FIG. 14, a UI in an image conversion process of hyperspectral data is illustrated. In the hyperspectral data, a partial area may be used for analysis through a cropping operation. The analysis area may be illustrated with two-point X-axis coordinate and Y-axis coordinate values. The user may display a RGB image in a HDR image location through the menu of the UI.

Figure 15:
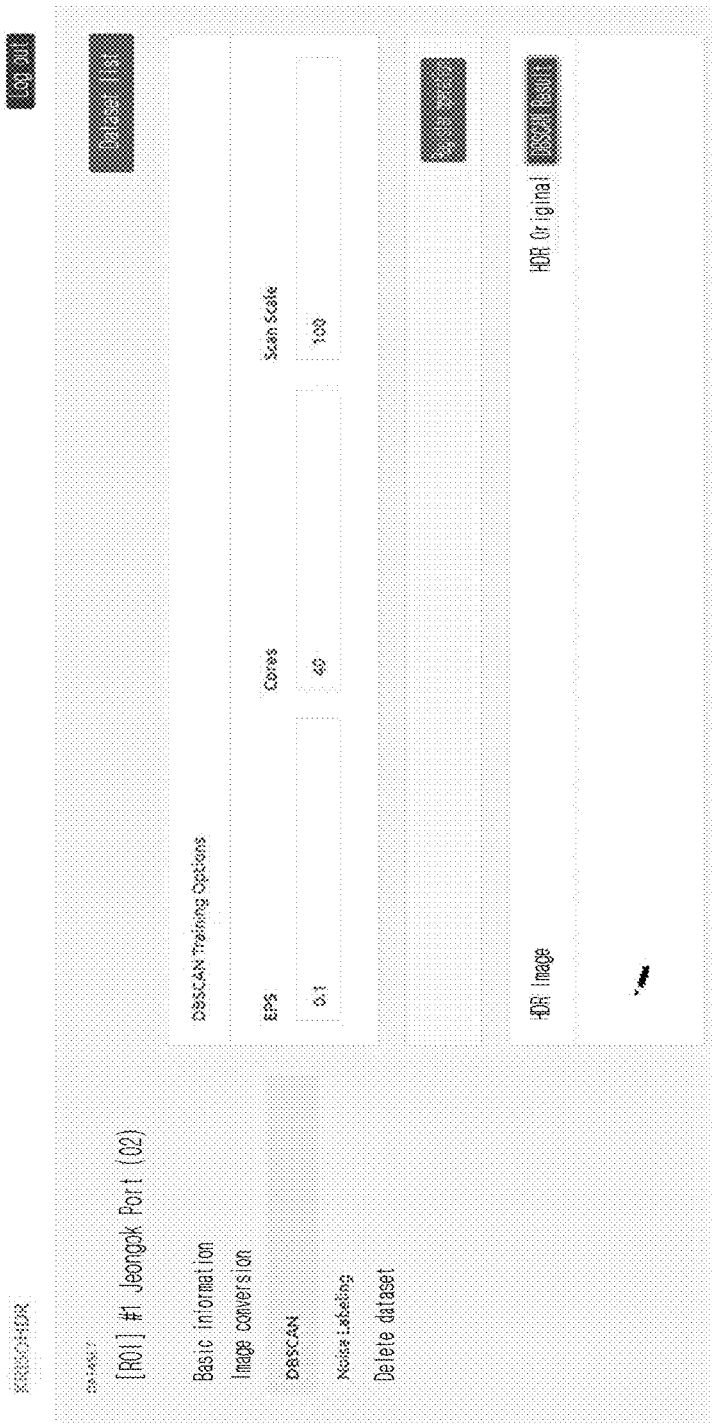
FIG. 15 is an example screen of an application UI for data analysis in the method for recognizing the marine object according to an embodiment of the present invention.

FIG. 15 is an example screen of an application UI for data analysis in the method for recognizing the marine object according to an embodiment of the present invention.

Referring to FIG. 15, a UI related to designation of parameters of the machine learning algorithm used for analysis of hyperspectral data according to an embodiment of the present invention is illustrated. It can be seen that EPS is designated to 0.1, Cores is designated to 40, and Scan Scale is designated to 100, respectively.

Figure 16:
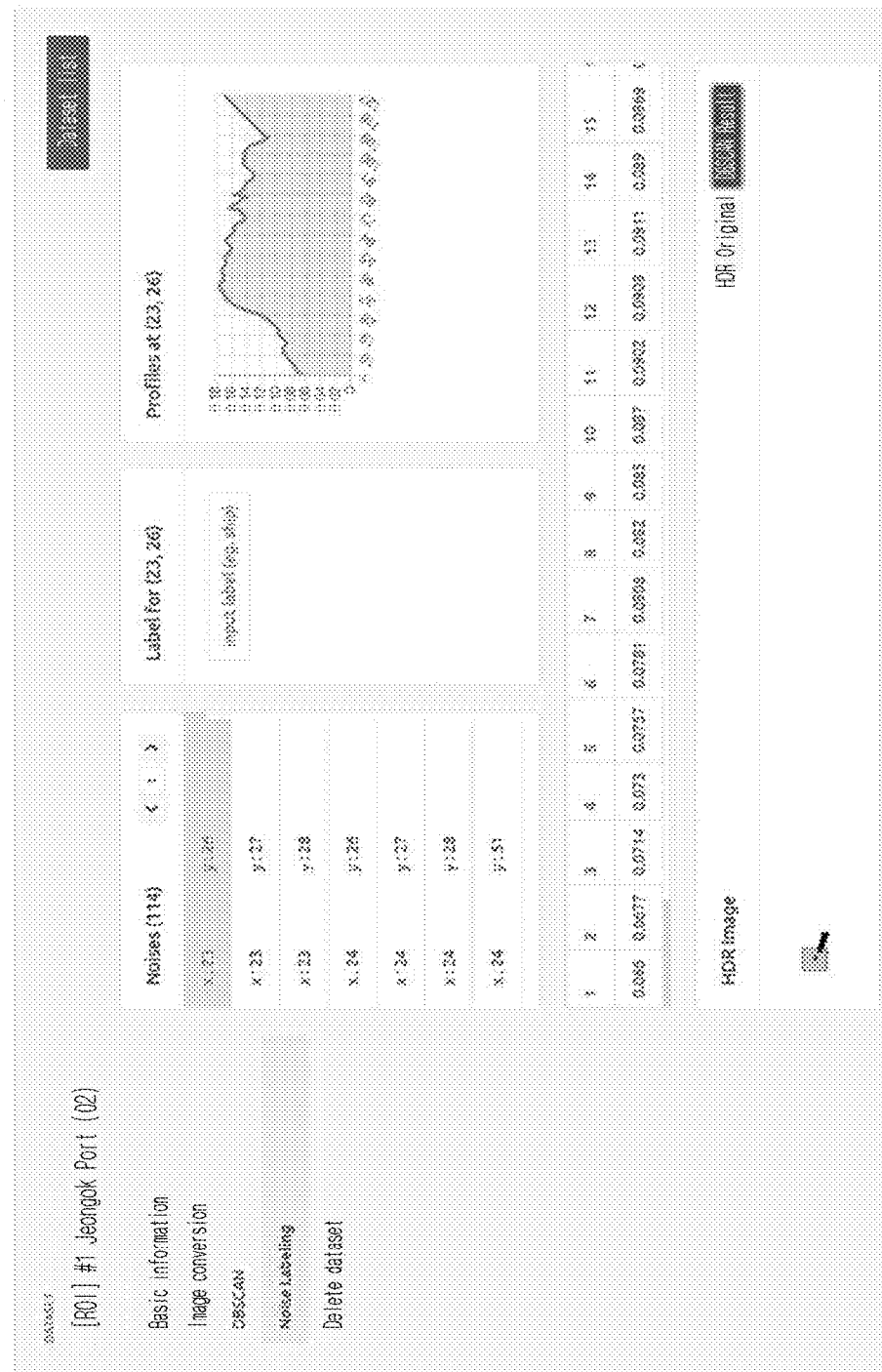
FIG. 16 is an example screen of an application UI for results of data analysis in the method for recognizing the marine object according to an embodiment of the present invention.

FIG. 16 is an example screen of an application UI for results of data analysis in the method for recognizing the marine object according to an embodiment of the present invention.

Referring to FIG. 16, the analysis result of the hyperspectral data collected in Jeongok Port is illustrated. Coordinates for noise are detected, and a user may perform labeling on the detected noise by referring to the spectrum information.

Figure 17:
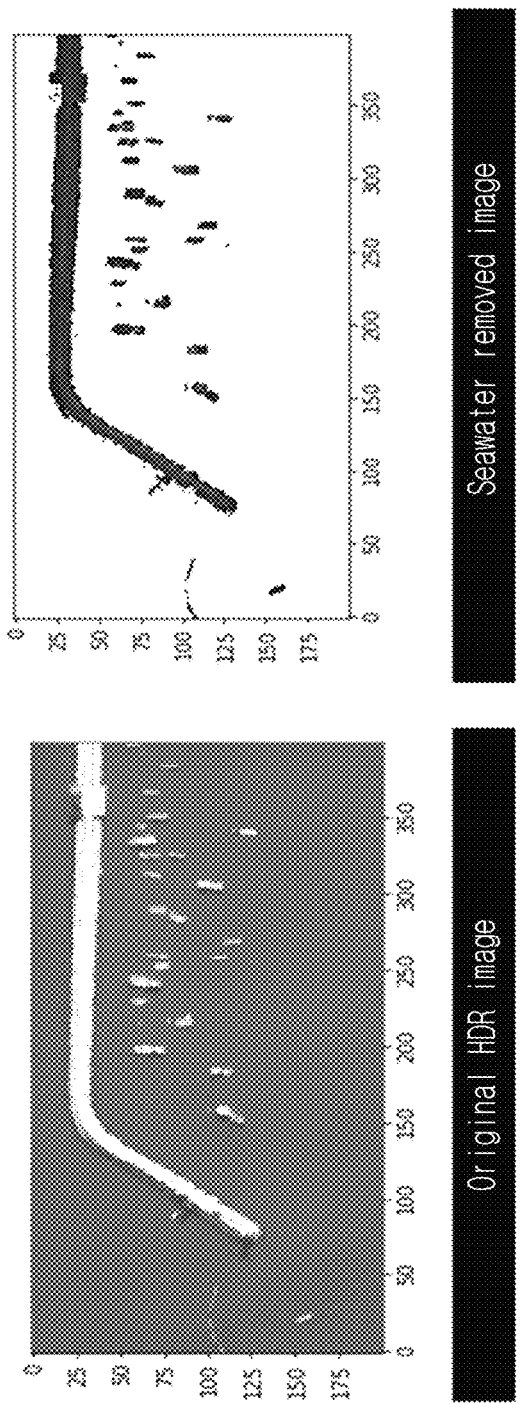
FIG. 17 is an example screen of an application UI for marine object detection in the method for recognizing the marine object according to an embodiment of the present invention.

FIG. 17 is an example screen of an application UI for marine object detection in the method for recognizing the marine object according to an embodiment of the present invention.

Referring to FIG. 17, a seawater removing process using the hyperspectral data in the marine object detecting process is illustrated. A left image is an image in which seawater is expressed, and a right image is an image in which seawater is removed.

Figure 18:
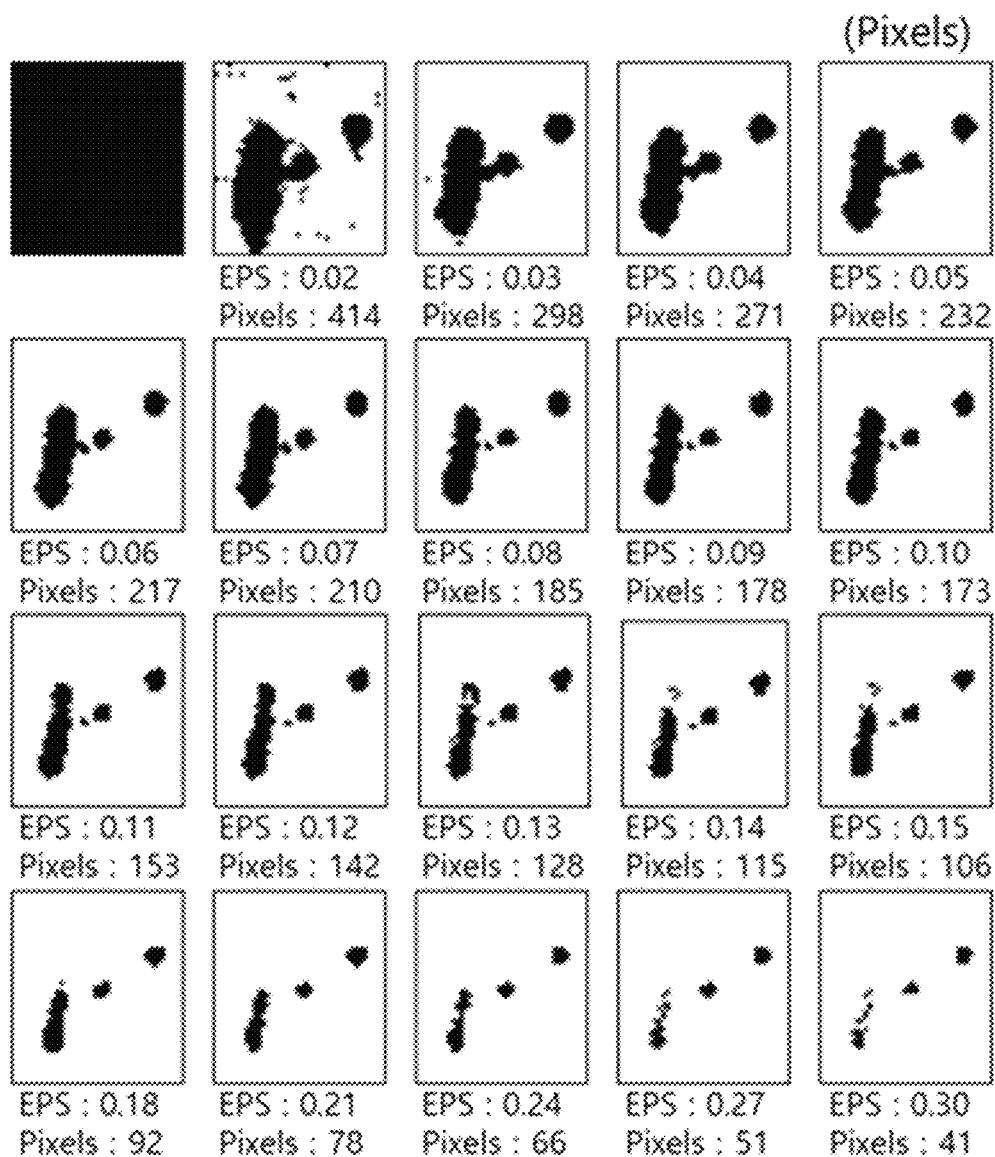
FIG. 18 is an example screen of an application UI for a marine object detection rate in the method for recognizing the marine object according to an embodiment of the present invention.

FIG. 18 is an example screen of an application UI for a marine object detection rate in the method for recognizing the marine object according to an embodiment of the present invention.

Referring to FIG. 18, pixel distribution of a marine object shown as noise on a binary image is shown according to the hyperspectral data analysis result. The distribution of pixels is differently shown depending on a specified EPS parameter value. The number of pixels may be analyzed while changing the value of the EPS parameter of DBSCAN from 0.01 to 0.03. As the EPS increases, the number of pixels detected through DBSCAN decreases.

Figure 19:
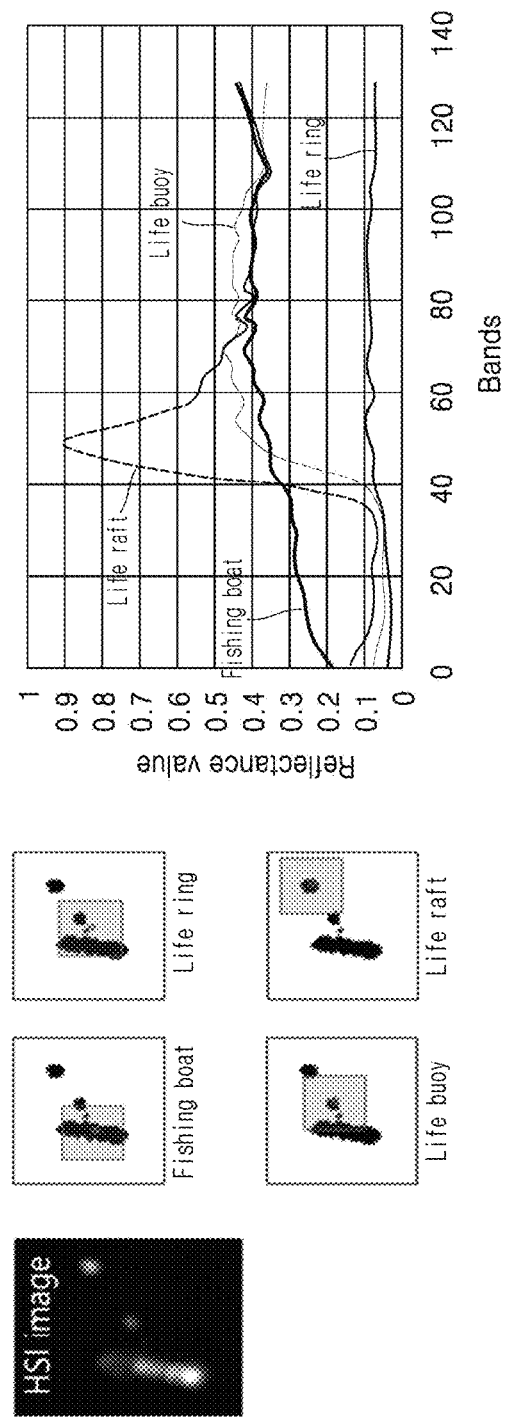
FIG. 19 is an example screen of an application UI for marine object recognition in the method for recognizing the marine object according to an embodiment of the present invention.

FIG. 19 is an example screen of an application UI for marine object recognition in the method for recognizing the marine object according to an embodiment of the present invention.

Referring to FIG. 19, a spectrum distribution of pixels constituting a fishing boat, a life ring, a life buoy, and a life raft classified as noise among marine objects is illustrated. Since the marine object has a unique spectrum according to its type, it is possible to identify a marine object based thereon.

According to the present invention, the preprocessing and processing of the hyperspectral data collected in real time according to a communication state may be performed in the air or on the ground.

In addition, the marine object detection model and identification model completed in the system on the ground can be loaded into the system in the air to be used for detection and identification of the marine object, and the performance can be upgraded through re-learning in the system on the ground.

In addition, it is possible to reduce the time required for identifying marine objects compared to seawater by using hyperspectral data, and also increase an identification rate.

In addition, according to the accumulation of the hyperspectral data, it is possible to learn and relearn a hyperspectral data-based marine object recognition model that recognizes marine objects shown as noise in machine learning clustering.

As described above, although several preferred embodiments of the present invention have been described with some examples, the descriptions of various exemplary embodiments described in the "detailed description for implementing the Invention" item are merely exemplary, and it will be appreciated by those skilled in the art that the present invention can be variously modified and carried out or equivalent executions to the present invention can be performed from the above description.

In addition, since the present invention can be implemented in various other forms, the present invention is not limited by the above description, and the above description is for the purpose of completing the disclosure of the present invention, and the above description is just provided to completely inform those skilled in the art of the scope of the present invention, and it should be known that the present invention is only defined by each of the claims.

INDUSTRIAL APPLICABILITY

According to the present invention, the preprocessing and processing of the hyperspectral data collected in real time according to a communication state can be performed in the air or on the ground.

The invention claimed is:

1. A method for recognizing a marine object based on hyperspectral data performed by a system for recognizing the marine object based on the hyperspectral data, the method comprising:
   collecting target hyperspectral data;
   preprocessing the target hyperspectral data;
   detecting and identifying an object included in the target hyperspectral data based on a marine object detection and identification model, trained through learning of the detection and identification of the marine object;
   generating learning data of the marine object detection and identification model; and
   training the marine object detection and identification model through the learning using the learning data,
   wherein the generating of the learning data comprises
   configuring a learning dataset for identifying a marine object using hyperspectral data;
   analyzing the dataset using an analysis algorithm;
   managing pixels constituting the object using the analysis result; and
   constructing learning data using pixel data,
   wherein the analyzing of the dataset comprises
   pre-screening hyperspectral data using a machine learning algorithm;
   detecting a marine object based on the pre-screening result; and
   identifying the detected marine object,
   wherein the identifying of the marine object comprises
   detecting noise formed by an object out of a cluster using a clustering algorithm; and
   identifying the marine object based on coordinate values and a spectrum of pixels corresponding to the noise,
   wherein in order to identify the marine object, the marine object is identified based on the coordinate values and the spectrum of the pixels corresponding to the noise,
   wherein the spectrum of the pixels in a noise area corresponding to the marine object shows a unique spectrum according to a type of marine object,
   wherein the preprocessing and data processing for object detection and identification are performed by at least one of a first subsystem in the sky and a second subsystem on the ground,
   wherein a control unit is configured to change a data processing subject or change a data processing ratio between the first subsystem and the second subsystem according to a change in communication state.

2. The method for recognizing the marine object based on the hyperspectral data of claim 1, wherein as the collecting of the target hyperspectral data is performed in real time, subsequent steps are performed in real time in conjunction with this step.

3. The method for recognizing the marine object based on the hyperspectral data of claim 1, wherein the preprocessing of the target hyperspectral data is configured to include at least one of radiating correction, atmospheric correction, and geometric correction of the target hyperspectral data.

4. The method for recognizing the marine object based on the hyperspectral data of claim 1, wherein the pre-screening comprises analyzing the density of a cluster while changing parameters for the formation of a marine object cluster.

5. The method for recognizing the marine object based on the hyperspectral data of claim 1, wherein the detecting of the marine object comprises removing data of a seawater area from the hyperspectral data based on the density of the marine object.

6. The method for recognizing the marine object based on the hyperspectral data of claim 1, wherein the managing of the pixels comprises labeling pixels formed by the marine object.

7. The method for recognizing the marine object based on the hyperspectral data of claim 1, wherein the constructing of the learning data comprises classifying pixel data formed by the labeled marine object; and constructing an integrated library using the classified pixel data.

8. The method for recognizing the marine object based on the hyperspectral data of claim 1, further comprising:
   detecting a communication state between the first subsystem and the second subsystem; and
   comparing the communication state with a processing speed of the first subsystem and the second subsystem, wherein an amount and a subject of data to be processed in the first subsystem and the second subsystem are determined according to the comparison result.

9. The method for recognizing the marine object based on the hyperspectral data of claim 8, further comprising:

changing a data processing subject or changing a data processing ratio between the first subsystem and the second subsystem according to a change in the communication state.

* * * * *